United States Patent
Weissman et al.

(10) Patent No.: US 6,560,678 B1
(45) Date of Patent: May 6, 2003

(54) MAINTAINING INFORMATION VARIETY IN AN INFORMATION RECEIVING SYSTEM

(75) Inventors: Terry Ray Weissman, Los Altos Hills, CA (US); Jonathan King Tash, Menlo Park, CA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/571,791

(22) Filed: May 16, 2000

(51) Int. Cl.$^7$ ................................................ G06F 12/06
(52) U.S. Cl. ........................ 711/133; 711/129; 709/215
(58) Field of Search ................................ 711/133, 134, 711/135, 136, 118, 123, 159, 129, 173; 725/89, 100, 2; 709/203, 215

(56) References Cited

U.S. PATENT DOCUMENTS

| | | | |
|---|---|---|---|
| 5,129,088 A | * | 7/1992 | Auslander et al. .............. 711/1 |
| 5,680,573 A | * | 10/1997 | Rubin et al. ................. 711/118 |
| 5,850,522 A | * | 12/1998 | Wlaschin ..................... 711/173 |
| 6,049,850 A | * | 4/2000 | Vishlitzky et al. ........... 711/113 |
| 6,205,519 B1 | * | 3/2001 | Aglietti et al. .............. 711/126 |
| 6,272,598 B1 | * | 8/2001 | Arlitt et al. .................. 709/203 |
| 6,434,669 B1 | * | 8/2002 | Arimilli et al. ............. 711/128 |
| 2001/0049771 A1 | * | 12/2001 | Tischler et al. ............. 711/133 |

* cited by examiner

*Primary Examiner*—Matthew Kim
*Assistant Examiner*—Pierre-Michel Bataille
(74) *Attorney, Agent, or Firm*—Blakely, Sokoloff, Taylor & Zafman

(57) ABSTRACT

A mechanism for maintaining information variety in an information receiving system which receives a stream of incoming objects each corresponding to one or more content categories. The information receiving system includes an object store for holding a set of cached objects for access by a consumer of information. The information receiving system includes an object store manager that determines which of the incoming objects are to be added to the object store and which of the cached objects are to be evicted from the object store such that a variety of information according to a set of consumer interests in the content categories is maintained in the object store.

21 Claims, 4 Drawing Sheets

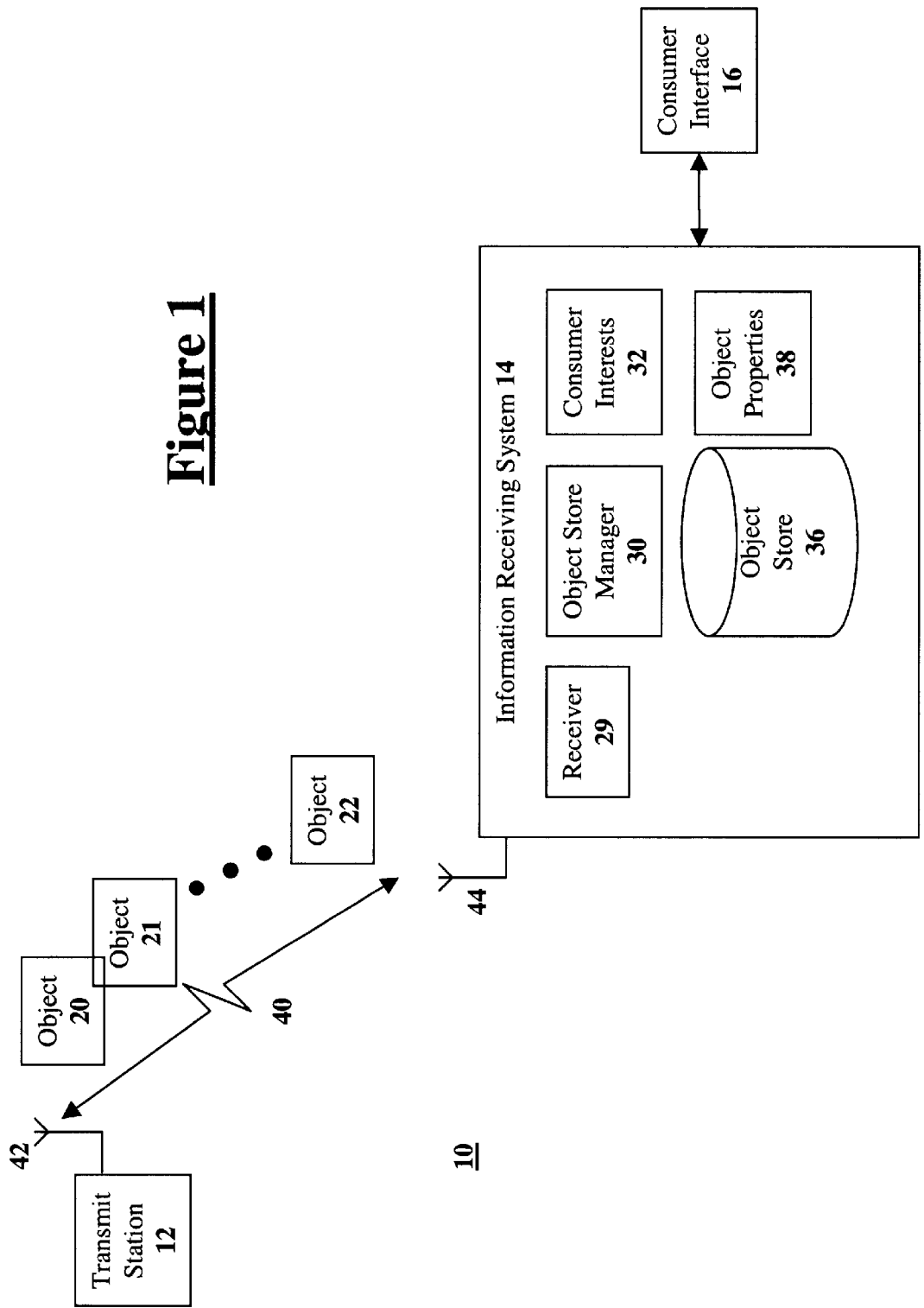

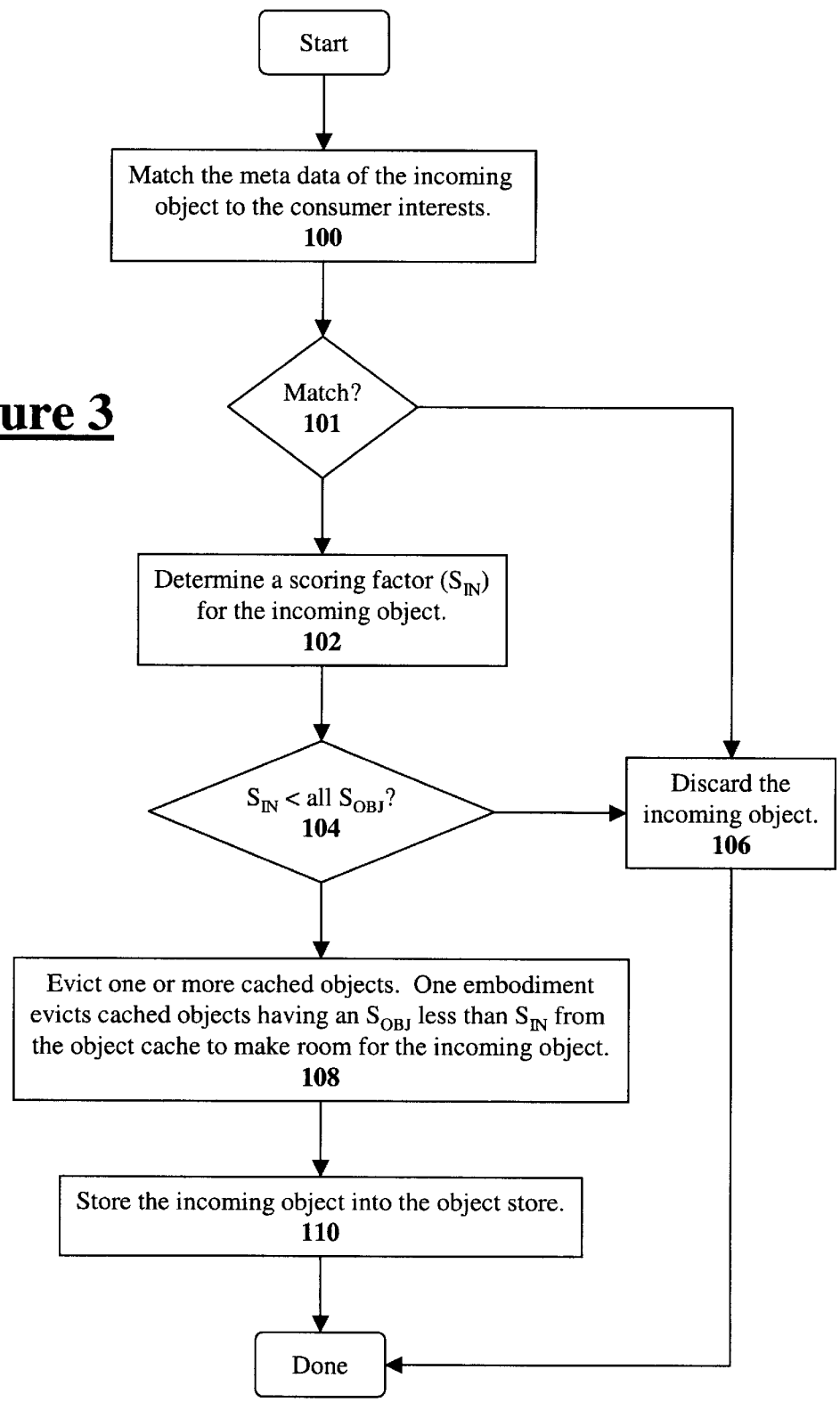

MAINTAINING INFORMATION VARIETY IN AN INFORMATION RECEIVING SYSTEM

BACKGROUND OF THE INVENTION

1. Field of Invention

The present invention pertains to the field of information receiving systems. More particularly, this invention relates to a mechanism for maintaining information variety in an information receiving system.

2. Art Background

Information systems enable a wide variety of information to be transmitted to individual consumers of information. A typical information system includes an information transmitter and one or more information receiving systems each possessed by a consumer of the information. Such an information system may be based on over-the-air transmissions, satellite transmissions, wire-based transmissions including cable, or fiber-optic transmissions, to name a few examples.

The relatively high bandwidth available in such systems usually has the potential of overwhelming the information storage capacity of the information receiving systems possessed by individual consumers of the information. It is therefore desirable to provide such information receiving systems with the capability of storing only selected portions of the transmitted information that is of interest to individual consumers. Moreover, it may be desirable to provide such information receiving systems with the capability of maintaining information variety in terms of the types of information of interest to individual consumers.

SUMMARY OF THE INVENTION

A mechanism for maintaining information variety in an information receiving system is disclosed. The information receiving system receives a stream of incoming objects each corresponding to one or more content categories. The information receiving system includes an object store for holding a set of cached objects for access by a consumer of information. The information receiving system includes an object store manager that determines which of the incoming objects are to be added to the object store and which of the cached objects are to be evicted from the object store such that a variety of information according to a set of consumer interests in the content categories is maintained in the object store.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 1 shows an information system that incorporates the present techniques;

FIG. 3 shows a method for handling an incoming object in one embodiment.

DETAILED DESCRIPTION

Figure 2A:
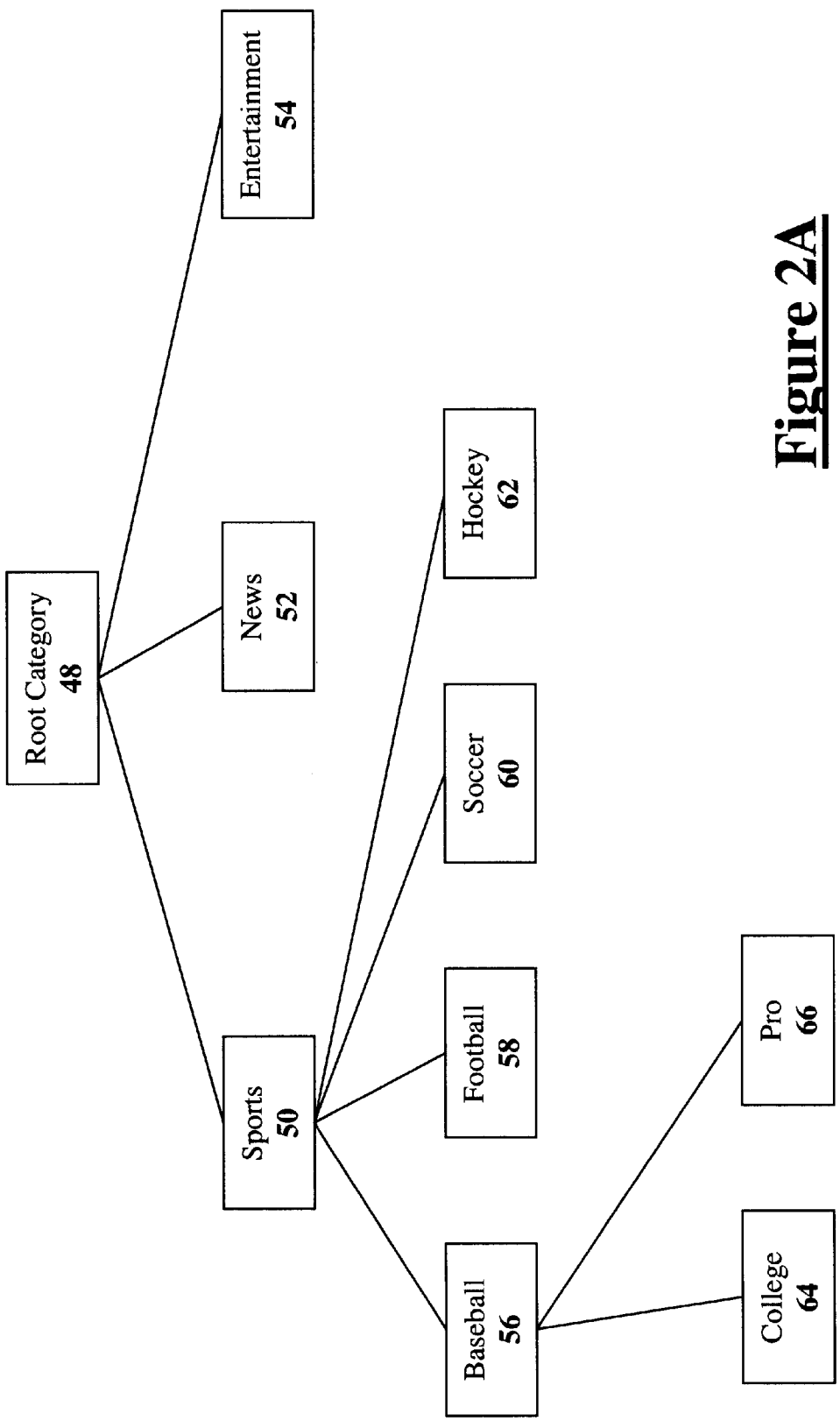
FIG. 2A illustrates a first example arrangement of content categories of the consumer interests.

FIG. 1 shows an information system 10 that incorporates the present techniques. The information system 10 includes a transmit station 12, an information receiving system 14 and a consumer interface 16. The transmit station 12 transmits a stream of objects 20–22 to the information receiving system 14 via a communication link 40.

The objects 20–22 carry a wide variety of information that may be rendered to an information consumer via the consumer interface 16. The information rendered via the consumer interface 16 may take the form of news stories, entertainment programming, or software to name a few examples. Each object 20–22 may carry digital audio data, digital video data, digital text data, or software code, or any combination of these. The objects 20–22 may be referred to as incoming objects.

Each incoming object includes a set of meta data. The meta data for an incoming object describes the incoming object in terms of a set of content properties. Examples of content properties include subject, author, content category, encryption level, forward error correction coding, timeliness, importance, content ratings such as for movies, and content type, to name only a few examples. The following focuses on an example in which the meta data is examined only for the content category (for example, news, sports, politics, entertainment, software downloads). Nevertheless, other types of meta data may be examined in addition to or in place of the content category meta data.

For example, the meta data for the object 20 may describe it as a news story while the meta data for the object 21 may describe it as a software download. The meta data for an incoming object may specify more than one content category. For example, the meta data for the object 22 may describe it as a news story involving politics.

The information receiving system 14 includes a receiver 29 that enables communication via the communication link 40. The information receiving system 14 also includes an object store 30 for holding a set of objects that may be accessed by a consumer via the consumer interface 16. Objects stored in the object store 30 may be referred to as cached objects.

The information receiving system 14 includes an object store manager 36 that manages the object store 30. The object store manager 36 determines which of the incoming objects received via the receiver 29 are to be stored in the object store 30 and which of the incoming objects are to be discarded and which cached objects are to be evicted from the object store 30 to make room for incoming objects. The object store manager 36 manages the object store 30 in order to enhance variety in the information stored in the object store 30 while conforming to a set of consumer interests 32. The variety in information is enhanced in the sense that large numbers of incoming objects that focus on a subset of the consumer interests 32 are prevented from driving all objects for the remaining of the consumer interests 32 out of the object store 30.

The consumer interests 32 are entered into the information receiving system 14 via the consumer interface 16. The consumer interests 32 specify a set of content categories that are of interest to one or more consumers who are associated with the information receiving system 14.

FIG. 2A shows an example arrangement of content categories 50–66 stored in the consumer interests 32. The content categories 50–66 have a hierarchical arrangement that descends from a root category 48. In this example, the sports category 50 has a set of sub-categories that include the baseball category 56, the football category 58, the soccer category 60, and the hockey category 62. The baseball category 56 has a set of sub-categories that include the college category 64 and the pro category 66. In general, any of the content categories 50–66 may have sub-categories according to the consumer selections made via the consumer interface 16.

Figure 2B:
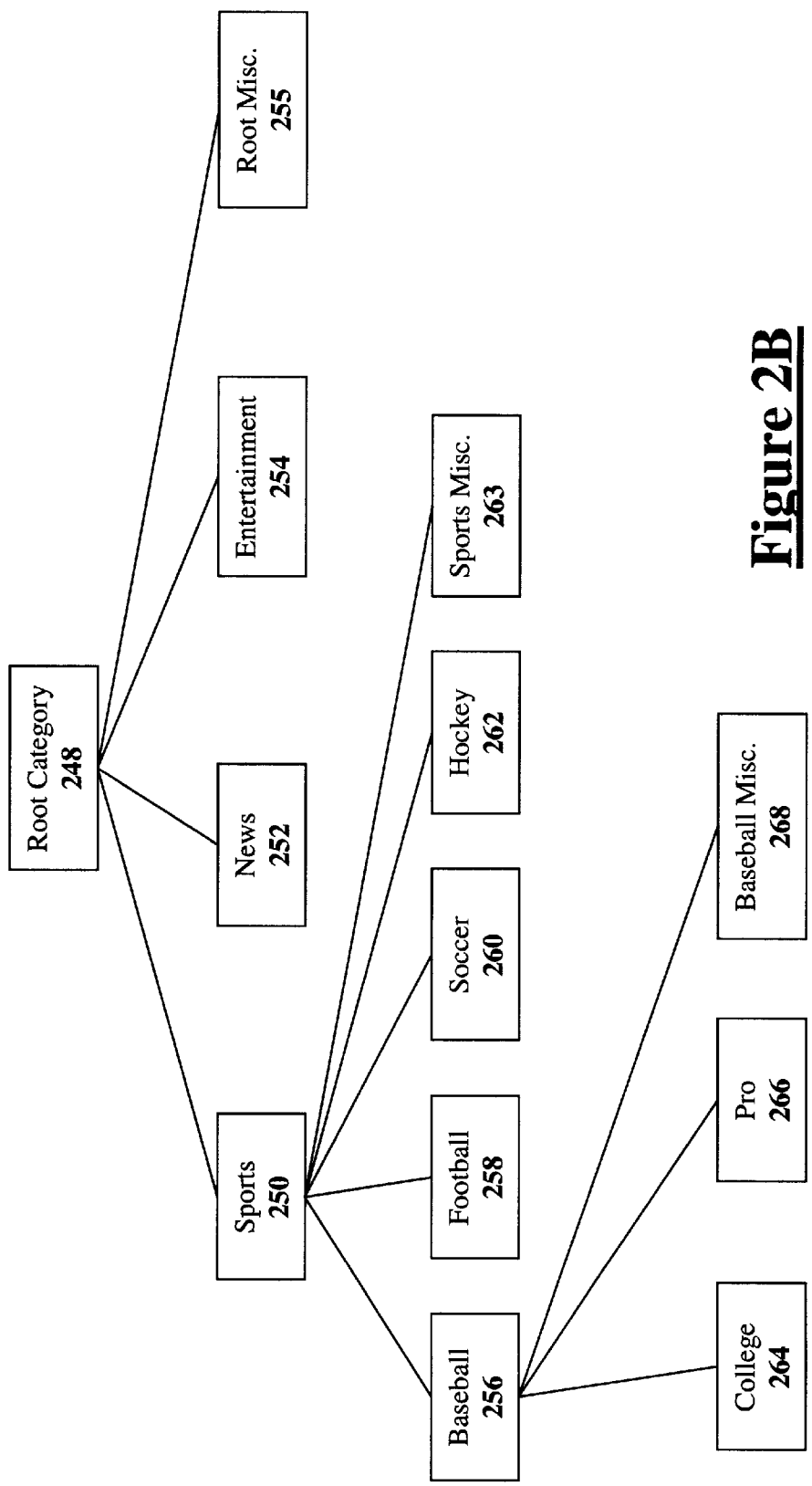
FIG. 2B illustrates a second example arrangement of content categories of the consumer interests that include miscellaneous categories within each subcategory.

In an alternate embodiment illustrated in FIG. 2B each category includes a miscellaneous subcategory that is used to store any content that is classified within the parent categorization but does not fit within any of the defined subcategories. For example, a story about the Irish sport of hurling may fall within the sports category 250 but it does not fall within any of the currently defined sports subcategories of baseball 256, football 258, soccer 260, or hockey 262. Such a story may be placed into the sports miscellaneous category 263. In such an embodiment, the miscellaneous category is treated just like another peer category.

Referring back to FIG. 2A, consumers assign importance factors to each of the content categories 50–66 via the consumer interface 16. In the following, the importance factor (i) assigned to a content category (C) is represented as $i_C$. For example, the importance factor assigned to the baseball category 56 is $i_{BASEBALL}$ and the importance factor assigned to the football category 58 is $i_{FOOTBALL}$. Table 1 shows an example set of importance factors assigned to the content categories 50–66. The importance of the root category 48 is always equal to 1.

TABLE 1

| Content Category | Importance Factor |
|---|---|
| Root | 1.0 |
| Sports | 0.7 |
| Baseball | 0.4 |
| College | 0.4 |
| Pro | 0.6 |
| Football | 0.6 |
| Soccer | 0.5 |
| Hockey | 0.0 |
| News | 0.4 |
| Entertainment | 0.1 |

Note that in an embodiment with the miscellaneous categories as shown in FIG. 2B, the miscellaneous categories may have their own importance settings. The importance setting of the miscellaneous category may be directly set by the user or it may default to a calculated value such as the average importance value of its peers.

A normalized importance (n) is determined for each of the content categories specified in the consumer interests 32. In one embodiment, the normalized importance for the content category C ($n_C$) is determined by dividing $i_C$ by the sum of the importance factors of all the sub-categories of the parent category of C. For example, the normalized importance for the baseball category 56 ($n_{BASEBALL}$) is determined by dividing $i_{BASEBALL}$ by the sum of the importance factors of the categories 56–66 which are all the sub-categories of the parent sports category 50 of the baseball category 56. Table 2 illustrates the normalized importance factors determined for the content categories 50–66.

TABLE 2

| Content Category | Importance Factor | Normalized Importance |
|---|---|---|
| Root | 1.0 | 1.0 |
| Sports | 0.7 | 0.583 |
| Baseball | 0.4 | 0.267 |
| College | 0.4 | 0.4 |
| Pro | 0.6 | 0.6 |
| Football | 0.6 | 0.4 |
| Soccer | 0.5 | 0.333 |
| Hockey | 0.0 | 0.0 |
| News | 0.4 | 0.333 |
| Entertainment | 0.1 | 0.083 |

A hierarchy-normalized importance (h) is then determined for each of the content categories specified in the consumer interests 32. The hierarchy normalized importance for the content category C ($h_C$) indicates where the C is in the hierarchy of categories and, in one embodiment, is determined by multiplying $n_C$ by the hierarchy normalized importance of the parent category of C. For example, the hierarchy-normalized importance for the baseball category 56 ($h_{BASEBALL}$) is determined by multiplying $n_{BASEBALL}$ by $h_{SPORTS}$ and the hierarchy normalized importance for the hockey category 62 ($h_{HOCKEY}$) is determined by multiplying $n_{HOCKEY}$ by $h_{SPORTS}$. Table 3 shows the hierarchy normalized importance factors determined for the content categories 50–66.

TABLE 3

| Content Category | Importance Factor | Normalized Importance | Hierarchy Normalized Importance |
|---|---|---|---|
| Root | 1.0 | 1.0 | 1.0 |
| Sports | 0.7 | 0.583 | 0.583 |
| Baseball | 0.4 | 0.267 | 0.155 |
| College | 0.4 | 0.4 | 0.062 |
| Pro | 0.6 | 0.6 | 0.093 |
| Football | 0.6 | 0.4 | 0.2332 |
| Soccer | 0.5 | 0.333 | 0.194 |
| Hockey | 0.0 | 0.0 | 0.0 |
| News | 0.4 | 0.333 | 0.3333 |
| Entertainment | 0.1 | 0.083 | 0.083 |

The steps of determining the normalized importance and the hierarchy normalized importance for the content categories may be performed via a software mechanism that runs once a consumer has selected and entered importance factors for the content categories 50–66 via the consumer interface 16.

The object store manager 36 maintains a set of object properties 38. The object properties 38 include a set of object properties for each of the cached objects held in the object store 30. Table 4 shows the object properties for a cached object in one embodiment.

TABLE 4

| Property Name | Description |
|---|---|
| Category List | List of content categories that are associated with the cached object |
| Size | The amount of space in the object store 30 taken up by the cached object. |
| Age | The length of time that the cached object has been in the object store 30. |

TABLE 4-continued

| Property Name | Description |
|---|---|
| Scoring Factor | A number that indicates the utility of the cached object in maintaining variety of consumer interests in the object store 30. |

Note that this set of object properties is only one possible example. Other embodiments may use more or less properties.

The object store manager 36 determines the category list entries in the object properties 38 for a cached object by examining the meta data for the cached object. For example, if the meta data for a cached object indicates that it is video data associated with college baseball then the object store manager 36 writes the category list for that cached object with the list Sports, Baseball, College, or with a list of references or identifiers for the content categories 50, 56, and 64.

The age entry in the object properties 38 for a cached object may be implemented as a timer that is periodically incremented starting from a time when that cached object was placed in the object store 30.

Object Scoring

The object store manager 36 determines a scoring factor entry in the object properties 38 for each cached object by initially determining a utilization factor for each of the content categories 50–66. A utilization factor for a content category indicates the amount of space in the object store 30 taken up by cached objects associated with that content category.

The utilization factor for the content category C ($u_C$) is determined by determining the sum of the sizes of all cached objects whose category list in the object properties 38 include the content category C or any of the sub-categories of C. For example, the object store manager 36 determines the utilization factor for the baseball category 56 ($u_{BASEBALL}$) by determining the sum of the sizes of all cached objects whose category list in the object properties 38 includes the baseball category 56 or the college and pro sub-categories 64 and 66. In another example, the object store manager 36 determines the utilization factor for the sports category 50 ($u_{SPORTS}$) by determining the sum of the sizes of all cached objects whose category list includes the sports category 50 or any of the sub-categories 56–66.

The object store manager 36 also determines an expected utilization factor for each of the content categories 50–66. The expected utilization factor for the content category C ($e_C$) is determined by multiplying the hierarchy normalized importance for the content category C ($h_C$) by the total space in the object store 30.

The object store manager 36 uses the above information to determine the scoring factors which it maintains a part of the object properties 38. A scoring factor for a cached object indicates the utility of that cached object in maintaining variety in the object store 30 in terms of the consumer interests 32. The object store manager 36 manages the object store 30 in order to retain cached object having a relatively high utility in maintaining variety in view of the consumer interests 32. In one embodiment, a scoring factor having a relatively high value indicates a relatively high utility and the object store manager 36 manages the object store 30 in order to retain cached object having a relatively high scoring factor.

In the following, a cached object in the object store 30 is represented as OBJ. The scoring factor for the cached object OBJ is represented as $s_{OBJ}$ and the age of the object OBJ is represented as $a_{OBJ}$.

The object store manager 36 in one embodiment determines a scoring factor $s_{OBJ}$ using a function of the $i_C$, the $n_C$, the $h_C$, the $u_C$, and the $e_C$ of each content category which is specified in category list for OBJ in the object properties 38 as well as $a_{OBJ}$ and $s_{OBJ}$. The function used to determines $s_{OBJ}$ is preselected to satisfy a set of criteria which will enhance the variety in the information stored in the object store 30 while conforming to the consumer interests 32. These criteria are selected to prevent, for example, large numbers of incoming objects associated with the football category 58 from driving all of the objects associated with the content categories 52–56 and 60–66 out of the object store 30.

One such criteria is that if the expected utilization $e_C$ associated with OBJ is relatively high in comparison to its actual utilization factor $u_C$, then the scoring factor for OBJ should be relatively high, thereby reducing the likelihood that OBJ will be evicted from the object store 30. Another criteria is that as the age $a_{OBJ}$ of OBJ increases its scoring factor should decrease to make eviction more likely. Another criteria is that if OBJ will provide enhanced variety in the object store 30, then its scoring factor should be relatively high to make eviction less likely.

A First Valuation Function

One example of a function f (OBJ) that satisfies these criteria is as follows.

$$f(OBJ) = \left(\frac{e_C}{u_C}\right)\left(\frac{s_{OBJ}}{a_{OBJ}}\right)$$

If the category list in the object properties 38 for OBJ specifies more than one content category then the function f(OBJ) expands as follows.

$$f(OBJ) = \left(\frac{e_{C1}}{u_{C1}}\right)\left(\frac{e_{C2}}{u_{C2}}\right)\cdots\left(\frac{s_{OBJ}}{a_{OBJ}}\right)$$

A Second Valuation Function

Consider an object number n in category k (herein after $O_n^k$) with an intrinsic utility value $$V(O_n^k).$$

This utility value is an equivalent of the $$\left(\frac{s_{OBJ}}{a_{OBJ}}\right)$$

term in the first valuation function. The intrinsic utility value $$V(O_n^k)$$

is the object's timeliness factor times its importance factor, as determined by the metadata properties. If the object $O_n^k$ belongs to a category k with expected utilization (or hierarchy normalized importance or category importance) $e_k$, then the score of object $O_n^k$ to the object store is:

$$f(O_n^k) = \sqrt{e_k \sum_i V(O_i^k)} - \sqrt{e_k \sum_{i \neq n} V(O_i^k)}$$

For the object store manager 36, the "score" for deciding which objects to keep/discard is an incremental value per megabyte, or the above divided by size_of (object $O_n^k$)

This system improves the variety since if the square-root was missing, this would just be "the value of the object store is the sum of the values of its objects, each weighted by the category importance $e_C$ for its category". Such a "linear" valuation function is not desirable, since more objects from the same category bring diminishing returns where variety is desired.

One system for valuing the object store is to instead determine the sum of the values of its categories, rather than the sum of the values of the objects. Each category in turn has a value that increases, albeit sublinearly, with the value of its objects. In such an embodiment, the total object store value is:

$$f(O_k) = \sum_k \left( \sqrt{e_k \sum_i O_n^i} \right)$$

The above incremental value is just the change in this value on addition or removal of an object.

In other embodiments, the square-root function can be replaced by any sublinear increasing function, e.g. cube-root, log(1+x), etc. The. square-root function is intuitive because of the analogy with orthogonal vector addition, and because it is relatively weak in the diminishing it causes. The function could even differ between the various categories. For example, there may be a category that has no diminishing return effect. The argument to this function should be just the sum value of the class objects, so that an object having 2x importance has the simple interpretation of being worth 2 other objects.

When an object belongs to multiple classes, its incremental value has a contribution from each class. If the cache value is thought of as the sum_over_classes, then it is simplest to just add these class contributions for each given object. An alternative is to combine the class incremental values $$V(O_n^k)$$

in a sublinear way as well—e.g.

$$sqrt(sqr(V(O_n^{k1})) + sqr(V(O_n^{k2}))),$$

or some other power, or max. Another alternative is to reduce the intrinsic value of such an object to avoid over-counting it.

Numerous other object scoring functions may be used to generate object scoring factors. These functions may include additional weighting factors that may favor some content categories or that may increase or decrease the likelihood of eviction for older objects.

The Operation of the Object Store System

FIG. 3 shows a method for handling an incoming object in one embodiment. The following description assumes that the object store 30 does not have enough free space to hold the incoming object. At step 100, the meta data of the incoming object is matched to the consumer interests 32. If none of the content categories 50–66 of the consumer interests 32 match to the incoming object at step 101 then the incoming object is discarded at step 106.

Otherwise at step 102, a scoring factor ($S_{IN}$) for the incoming object is determined. The scoring factor $S_{IN}$ is determined based on the content category or categories determined at step 100 and in a manner similar to that outlined above for determining a scoring factor $s_{OBJ}$ for a cached object.

At step 104, it is determined whether the scoring factor $s_{IN}$ for the incoming object is less than the scoring factors $s_{OBJ}$ of all the cached objects in the object store 30. If it is then the incoming object is discarded at step 106. Otherwise at step 108, the cached objects having scoring factors lower than $s_{IN}$ are discarded, from lower to higher values of $s_{OBJ}$, until enough room is available in the object store 30 to hold the incoming object. In an alternate embodiment, the system discards objects in a manner that causes the sum of scores of the remaining objects to be maximized. The incoming object is then stored in the object store 30 at step 110.

The scoring factors $s_{OBJ}$ of all the cached objects are periodically updated as objects are added to and evicted from the object store 30 over time and as cached objects age over time.

The communication link 40 may be a wireless communication link via a pair of antennas 42 and 44. Examples include over the air signals and satellite communication links. Alternatively, the communication link 40 may be a wire-based or optical communication link. Examples include cable links and fiber optic links. The receiver 14 is adapted to the particular implementation of the communication link 40 including physical requirements and communication protocols.

In one embodiment, the transmit station 12 is a digital television transmitter and the receiver 29 is a digital television receiver. In this embodiment, the objects 20–22 contain digital data that is carried according to a digital television transmission standard.

In one embodiment, the information receiving system 14 is implemented as a Unix-based computer system and the object store 30 is implemented with a magnetic disk storage device. In other embodiments, any imaginable combination of storage means and processing means may be used to implement the information receiving system 14.

The consumer interests 32 may be stored in any type of storage device and/or type of memory and may be implemented as a database. Likewise, the object properties 38 may be stored in any type of storage device and/or type of memory and may be implemented as a database.

The consumer interface 16 may be any type of presentation system that is appropriate for presenting the stored objects to a user. One typical consumer user interface 16 is a personal computer system that includes web-browsing functionality for interfacing to the information receiving system 14 using web protocols. For example, the information receiving system 14 may generate one or more web pages that enable consumers to select the content categories to be stored in the consumer interests 32 and enter corresponding interest factors for the selected content categories. In addition, the consumer interface 16 includes the appropriate hardware for rendering video and audio information contained in the cached objects. Other embodiments include television set-top boxes.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An information receiving system, comprising:
a receiver to receive a stream of incoming objects, each object corresponding to one or more content categories;
an object store to hold a set of cached objects for access by a consumer; and
an object store manager to determine the incoming objects to be added to the object store and the cached objects to be evicted from the object store in order to maintain a variety of a set of consumer interests in the content categories in the object store,
wherein the object store manager further to determine an indication of utility of the incoming object and to compare the indication of utility of the incoming object to an indication of utility for each cached object, the object manager to determine the indication of utility by utilizing a function which is preselected to satisfy a set of criteria which will enhance the variety.

2. The information receiving system of claim 1, wherein the object store manager evicts one or more of the cached objects for which the indication of utility is less than: the indication of utility of the incoming object and stores the incoming object in the object store.

3. The information receiving system of claim 1, wherein the object store manager periodically determines the indications of utility for the cached objects.

4. The information receiving system of claim 1, wherein for each cached object the function is based on an indication of expected utilization of the object store by the cached object and an indication of actual utilization of the object store by the cached object.

5. The information receiving system of claim 4, wherein the criteria include a criteria that if the indication of expected utilization is relatively high in comparison to the indication of actual utilization then the likelihood that the corresponding cached object will be evicted from the object store is reduced.

6. The information receiving system of claim 1, wherein for each cached object the function is based on an indication of age of the cached object.

7. The information receiving system of claim 6, wherein the criteria include a criteria that if the age is relatively high then the likelihood that the corresponding cached object will be evicted from the object store is increased.

8. An information receiving system, comprising:
a receiver to obtain a stream of incoming objects via a communication link, each incoming object corresponding to one or more content categories;
an object store to hold a set of cached objects for access by a consumer; and
an object store manager to maintain a variety of a set of consumer interests in the content categories in the object store,
wherein the object store manager to determine whether an incoming object of the stream is to be stored in the object store by determining an indication of utility of the incoming and by comparing the indication of utility of the incoming object to an indication of utility for each cached object, the object manager to determine the indication of utility by utilizing a function which is preselected to satisfy a set of criteria which will enhance the variety.

9. The information receiving system of claim 8, wherein the object store manager evicts one or more of the cached objects for which the indication of utility is less than the indication of utility of the incoming object and stores the incoming object in the object store.

10. The information receiving system of claim 8, wherein the object store manager periodically determines the indications of utility for the cached objects.

11. The information receiving system of claim 8, wherein for each cached object the function is based on an indication of expected utilization of the object store by the cached object and an indication of actual utilization of the object store by the cached object.

12. The information receiving system of claim 11, wherein the criteria include a criteria that if the indication of expected utilization is relatively high in comparison to the indication of actual utilization then the likelihood that the corresponding cached object will be evicted from the object store is reduced.

13. The information receiving system of claim 8, wherein for each cached object the function is based on an indication of age of the cached object.

14. The information receiving system of claim 13, wherein the criteria include a criteria that if the age is relatively high then the likelihood that the corresponding cached object will be evicted from the object store is increased.

15. A method for maintaining information for access by a consumer, said method comprising:
obtaining a stream of incoming objects each corresponding to one or more content categories;
storing a subset of the incoming objects as cached objects to be accessible by the consumer; and
determining which of the incoming objects are to be added to the cached objects and which of the cached objects are to be evicted in order to maintain a variety of a set of consumer interests in the content categories in the cached objects by determining an indication of utility of the incoming object utilizing a function which is preselected to satisfy a set of criteria which will enhance the variety and comparing the indication of utility of the incoming object to an indication of utility for each cached object.

16. The method of claim 15, further comprising:
evicting one or more of the cached objects for which the indication of utility is less than the indication of utility of the incoming object; and
storing the incoming object.

17. The method of claim 15, further comprising:
periodically determining the indications of utility for the cached objects.

18. The method of claim 15, wherein determining the indications of utility comprises:
selecting the function based on an indication of expected utilization of each cached object and an indication of actual utilization of each cached object.

19. The method of claim 18, wherein selecting the function includes selecting the function to satisfy a criteria that if the indication of expected utilization is relatively high in comparison to the indication of actual utilization then the likelihood that the corresponding cached object will be evicted is reduced.

20. The method of claim 15, wherein determining the indications of utility comprises selecting the function based on an indication of age of the cached object.

21. The method of claim 20, wherein selecting the function includes selecting the function to satisfy a criteria that if the age is relatively high then the likelihood that the corresponding cached object will be evicted is increased.

* * * * *